(12) United States Patent
Gommershtadt et al.

(10) Patent No.: US 12,536,354 B1
(45) Date of Patent: Jan. 27, 2026

(54) DETERMINISTIC CROSS-PLATFORM CIRCUIT DESIGN EMULATION

(71) Applicant: Synopsys, Inc., Mountain View, CA (US)

(72) Inventors: Boris Gommershtadt, Mevaseret Zion (IL); Yan Zucker, Holon (IL); Yuval Szwarcfiter, Petah-Tikva (IL)

(73) Assignee: Databricks, Inc., San Francisco, CA (US)

( * ) Notice: Subject to any disclaimer, the term of this patent is extended or adjusted under 35 U.S.C. 154(b) by 701 days.

(21) Appl. No.: 17/953,192

(22) Filed: Sep. 26, 2022

Related U.S. Application Data

(60) Provisional application No. 63/253,230, filed on Oct. 7, 2021.

(51) Int. Cl.
*G06F 30/327* (2020.01)
*G06F 30/3312* (2020.01)

(52) U.S. Cl.
CPC ........ *G06F 30/327* (2020.01); *G06F 30/3312* (2020.01)

(58) Field of Classification Search
USPC .......................................... 716/103
See application file for complete search history.

(56) References Cited

U.S. PATENT DOCUMENTS

| | | | | |
|---|---|---|---|---|
| 2005/0068949 | A1* | 3/2005 | Diehl | G06F 30/331 370/389 |
| 2009/0150136 | A1* | 6/2009 | Yang | G06F 30/33 703/13 |
| 2014/0074761 | A1* | 3/2014 | Hunzinger | G06N 3/049 706/15 |
| 2017/0255728 | A1* | 9/2017 | Wakefield | G06F 11/261 |
| 2017/0337308 | A1* | 11/2017 | Rotenberg | G06F 11/3698 |

* cited by examiner

*Primary Examiner* — Mohammed Alam
(74) *Attorney, Agent, or Firm* — Fenwick & West LLP

(57) ABSTRACT

A configuration/method/system for cross-platform capture/replay of an emulation of a circuit design. The system receives, during an emulation of a circuit design performed on a first platform, time-annotated ready bits messages (TARBMs), and generates a first set of TARBM files, each corresponding to a particular FPGA in the first set of FPGAs. The system also generates a first set of bitmap file for the first platform, and a second set of bitmap file for a second platform. Each bitmap file records a bit index of each ready bit of an FPGA in a corresponding platform. The system then generates a second set of TARBM files based in part on the first set of TARBM files and the two sets of bitmap files. The emulation of the circuit design can then be replayed on the second platform based in part on the second set of TARBM files.

9 Claims, 11 Drawing Sheets

Example: TARBM file (HEX representation)
```
driver: designTop.wrapper.FPGA_U0_M0_F0
port: tarbm_msg_out_port
size: 3
ffffffff ffffffff 00000000
00000000 00102137 00000003
00000000 00152142 00000007
00000000 00152145 00000003
00000000 0026186e 0000000b
00000000 00261871 00000003
00000000 00370f33 0000000f
00000000 00370f35 00000003
00000000 004805fc 0000000b
00000000 004805ff 00000003
00000000 0058fcde 00000003
EOF
```

*FIG. 3*

Example: Bitmap file: designTop.wrapper.FPGA_U0_M0_F0
```
32
0       clk_negedge_ready_0
1       clk_posedge_ready_0
2       driver_1.msg_in_0
3       driver_2.msg_in_0
```

*FIG. 4A*

Bitmap file 1: designTop.wrapper.FPGA_U0_M0_F0
```
32
0       clk_negedge_ready_0
1       clk_posedge_ready_0
2       driver_1.msg_in_0
```

*FIG. 4B*

Bitmap file 2: designTop.wrapper.FPGA_U0_M0_F1
```
32
0       driver_2.msg_in_0
```

*FIG. 4C*

Example: TAB Files extracted from source TARBM file ⤳ 233

| TAB of bit 3 | TAB of bit 2 | TAB of bit 1 | TAB of bit 0 |
|---|---|---|---|
| driver_2.msg_in_0 | driver_1.msg_in_0 | clk_posedge_ready_0 | clk_negedge_ready_0 |
| ffffffff ffffffff 0 | ffffffff ffffffff 0 | ffffffff ffffffff 0 | ffffffff ffffffff 0 |
| 00000000 00102137 0 | 00000000 00102137 1 | 00000000 00102137 1 | 00000000 00102137 1 |
| 00000000 00152142 0 | 00000000 00152142 1 | 00000000 00152142 1 | 00000000 00152142 1 |
| 00000000 00152145 0 | 00000000 00152145 0 | 00000000 00152145 1 | 00000000 00152145 1 |
| 00000000 0026186e 1 | 00000000 0026186e 0 | 00000000 0026186e 1 | 00000000 0026186e 1 |
| 00000000 00261871 0 | 00000000 00261871 0 | 00000000 00261871 1 | 00000000 00261871 1 |
| 00000000 00370f33 1 | 00000000 00370f33 1 | 00000000 00370f33 1 | 00000000 00370f33 1 |
| 00000000 00370f35 0 | 00000000 00370f35 0 | 00000000 00370f35 1 | 00000000 00370f35 1 |
| 00000000 004805fc 1 | 00000000 004805fc 0 | 00000000 004805fc 1 | 00000000 004805fc 1 |
| 00000000 004805ff 0 | 00000000 004805ff 0 | 00000000 004805ff 1 | 00000000 004805ff 1 |
| 00000000 0058fcde 0 | 00000000 0058fcde 0 | 00000000 0058fcde 1 | 00000000 0058fcde 1 |

*FIG. 5A*

Example: Compressed TAB Files ⤵ 235

| TAB File of bit 3 | TAB File of bit 2 | TAB File of bit 1 | TAB File of bit 0 |
|---|---|---|---|
| driver_2.msg_in_0 | driver_1.msg_in_0 | clk_posedge_ready_0 | clk_negedge_ready_0 |
| ffffffff ffffffff 0 | ffffffff ffffffff 0 | ffffffff ffffffff 0 | ffffffff ffffffff 0 |
| 00000000 0026186e 1 | 00000000 00152142 1 | 00000000 00102137 1 | 00000000 00102137 1 |
| 00000000 00261871 0 | 00000000 00152145 0 | 00000000 0058fcde 1 | 00000000 0058fcde 1 |
| 00000000 00370f33 1 | 00000000 00370f33 1 | | |
| 00000000 00370f35 0 | 00000000 00370f35 0 | | |
| 00000000 004805fc 1 | 00000000 0058fcde 0 | | |
| 00000000 004805ff 0 | | | |
| 00000000 0058fcde 0 | | | |

*FIG. 5B*

Example: Reconstructed target TARBM files (HEX representation)

237

TARBM file 1
driver:
designTop.wrapper.FPGA_U0_M0_F0
port: tarbm_msg_out_port
size: 3
ffffffff ffffffff 00000000
00000000 00102137 00000003
00000000 00152142 00000007
00000000 00152145 00000003
00000000 00370f33 00000007
00000000 00370f35 00000003
00000000 0058fcde 00000003
EOF

TARBM file 2
driver:
designTop.wrapper.FPGA_U0_M0_F1
port: tarbm_msg_out_port
size: 3
ffffffff ffffffff 00000000
00000000 0026186e 00000001
00000000 00261871 00000000
00000000 00370f33 00000001
00000000 00370f35 00000000
00000000 004805fc 00000001
00000000 004805ff 00000000
00000000 0058fcde 00000000
EOF

*FIG. 5C*

DETERMINISTIC CROSS-PLATFORM CIRCUIT DESIGN EMULATION

RELATED APPLICATION

This application claims a benefit under 35 U.S.C. § 119 (e), and priority, to U.S. Provisional Patent Application Ser. No. 63/253,230, "Deterministic Emulation Cross-Platform Stimuli Protocol," filed Oct. 7, 2021. The subject matter of all of the foregoing is incorporated herein by reference in their entirety.

TECHNICAL FIELD

The present disclosure relates to the field of circuit design and circuit design emulation, and more particularly, to configurations for capturing and replaying circuit design emulations across platforms.

BACKGROUND

A digital circuit simulation is usually fully deterministic if the design and its stimuli are both deterministic. As such, to debug a specific simulation, one can re-execute the same simulation again to verify the design and the stimuli. This, however, is not true for digital design emulations. During an emulation, a host computing device feeds stimuli to an emulation machine, but this process is not deterministic in time because traffic between host computing system and the emulation machine is often non-deterministic. Hence, it is difficult to reproduce the same emulation by just re-executing the emulation again because every emulation session is unique, which results in difficulties in emulation verifications.

SUMMARY

Disclosed is a configuration (system, method, and/or non-transitory computer readable storage medium comprised of stored instructions) for cross-platform capture and replay of an emulation of a circuit design. The configuration may include a first emulation platform having a first set of field programmable gate arrays (FPGAs). The configuration receives, during an emulation of a circuit design, time-annotated ready bits messages (TARBMs). Each of the TARBMs contains an RBM annotated with timing information. Each RBM is a message that records a combined value of ready bits of the emulated circuit design. The configuration generates a first set of TARBM files. Each TARBM file in the first set of TARBM files records a subset of TARBMs corresponding to a particular FPGA in the first set of FPGAs. In some embodiments, the timing information includes an emulation cycle for each of the at least the subset of RBMs. The emulation of the circuit design can then be replayed on the first emulation platform based in part on the first set of TARBM files.

The configuration also generates a first set of bitmap files for the first emulation platform. Each of the first set of bitmap files records a bit index of each ready bit of an FPGA in the first set of FPGAs, and a register transfer level (RTL) logical signal name of the corresponding ready bit. The system also generates a second set of bitmap files for a second emulation platform that has a second set of FPGAs. Each of the second set of bitmap files records a bit index of each ready bit of an FPGA in the second set of FPGAs, and an RTL logical name of the corresponding ready bit.

The configuration generates a second set of TARBM files based in part on the first set of TARBM files, the first set of bitmap files, and the second set of bitmap files. Each TARBM file in the second set of TARBM files records a subset of TARBMs corresponding to a particular FPGA in the second set of FPGAs. The emulation of the circuit design can then be replayed on the second emulation platform based in part on the second set of TARBM files.

In some embodiments, generating the second set of TARBM files may include extracting time-annotated bits (TAB) values from TARBMs contained in the first set of TARBM files, and generating a set of TAB files for the ready bits of the emulated design. Each TAB file contains bit values of a corresponding ready bit annotated with timing information. In some embodiments, each of the set of TAB files is further compressed to remove entries that do not reflect a change in bit value to generate a compressed TAB file, except for a last entry that corresponds to an end emulation cycle. The second set of TARBM files are generated based on the set of compressed TAB files and the second set of bitmap files.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 3 illustrates an example TARBM file in Hexadecimal (HEX) format in accordance with one or more embodiments.

FIG. 4A illustrates an example bitmap file corresponding to the single FPGA in the target emulation system in accordance with one or more embodiments, and FIGS. 4B and 4C illustrate examples of bitmap files, corresponding to the two FPGAs in the target emulation system in accordance with one or more embodiments.

FIG. 5A illustrates an example of a set of TAB files extracted from the source TARBM file shown in FIG. 3 in accordance with one or more embodiments.

FIG. 5B illustrates an example of a set of compressed TAB files generated based on the TAB files of FIG. 5A in accordance with one or more embodiments.

FIG. 5C illustrates an example of target TARBM files in accordance with one or more embodiments.

DETAILED DESCRIPTION

During emulation, a host computing device feeds stimuli to an emulation machine, and this process is almost never deterministic in time because in part the traffic between host and machine is often non-deterministic. Hence, it is impossible to reproduce the same emulation by just re-executing the emulation again. In other words, every emulation session is unique, which results in difficulties in emulation verification.

To overcome this problem, a design stimulus may be recorded. For example, the design stimulus may be captured during a main run, and the captured design stimulus may then be replayed during a debug run. In existing emulation systems, each stimulus may be recorded as a simple single waveform using standard waveform formats, and these waveforms may then be injected back into the design during a replay run.

The capture and replay approach executes both the captured session and the replay session using a same hardware architecture of the emulation machine and a same compilation of the verified design. Accordingly, the capture and replay approach generally works in the case when both sessions are performed on a same platform. If the platforms are different, however, rerun of a captured session faces computation complexity. For example, when each stimulus is recorded as a simple single waveform using standard waveform formats, cross-platform porting may require complicated post-processing of voluminous waveforms that makes the porting generally infeasible.

The principles described herein enable cross-platform capture and replay of circuit design emulations. The disclosed configurations include annotating a design stimulus run on a first emulation platform with timing information, instead of the traditional method of recordation of waveforms. The annotated design stimulus can then be transformed and ported to a second emulation platform.

Technical advantages of the present disclosure include, but are not limited to, enabling capture of emulation with reduced memory usage, and replay of the captured emulation in same or different platforms with reduced and manageable computational complexity.

Figure 1:
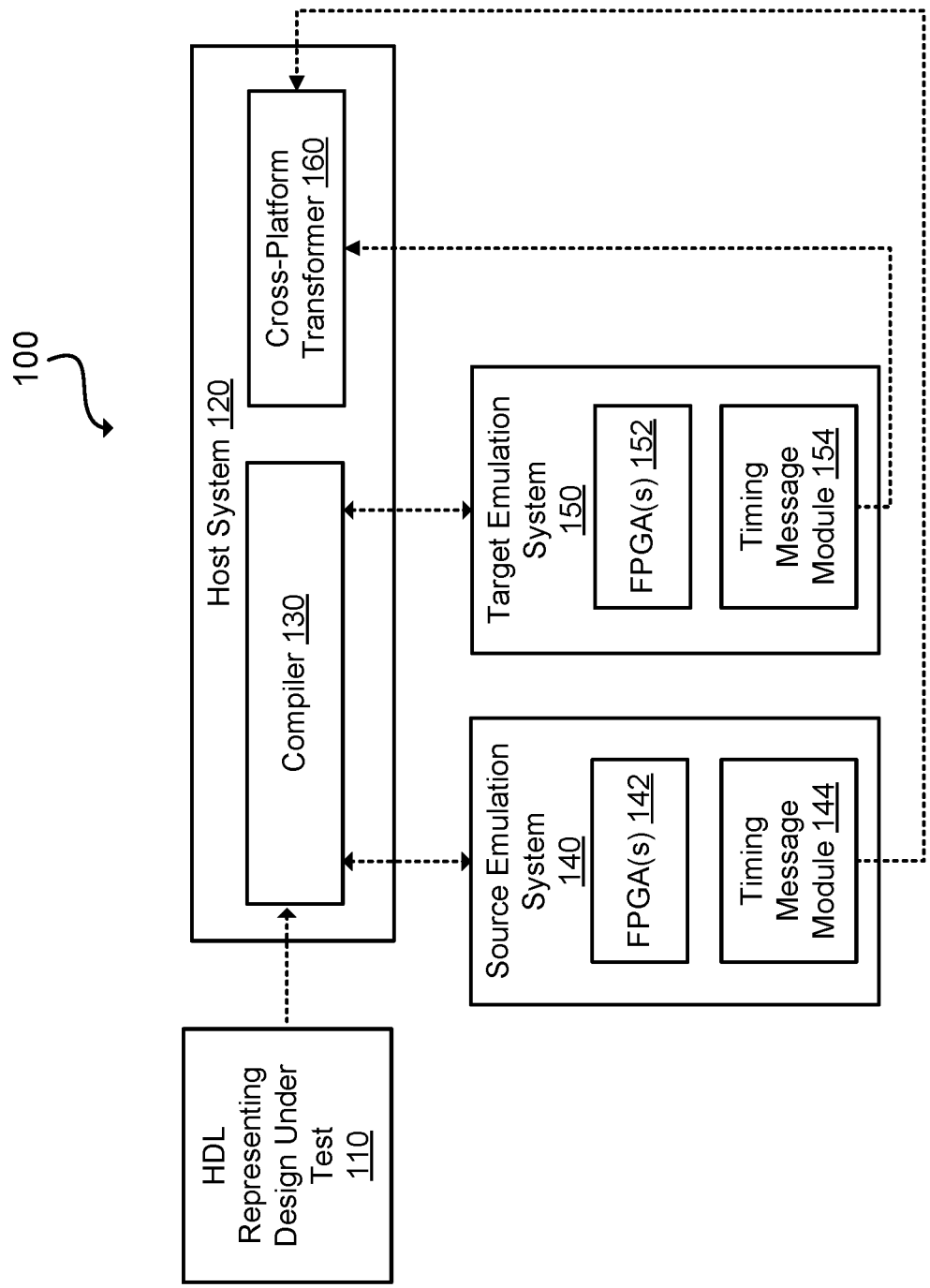
FIG. 1 depicts a diagram of an example emulation environment in accordance with some embodiments of the present disclosure.

Referring now to FIG. 1, it depicts a diagram of an example emulation environment 100 in accordance with some embodiments of the present disclosure. The emulation environment 100 may verify the functionality of a circuit design across different emulation platforms. The emulation environment 100 may include a host system 120 (e.g., a computer that is part of an EDA system) and one or more emulation systems 140, 150 (also referred to as emulation platforms). In some embodiments, each emulation system 140, 150 includes a set of programmable devices such as one or more field programmable gate arrays (FPGAs) 142, 152. A circuit design to be emulated is also referred to as a Design Under Test (DUT) 110 where data and information from the emulation are used to verify the functionality of the DUT. The DUT may be described in a hardware description language (HDL). The host system 120 includes a compiler 130. The compiler 130 generates data and information to cause the emulation system 140 or 150 to emulate a circuit design. Additional details about DUT 110, the compiler 130, and/or emulation systems 140, 150 are further discussed below with respect to FIG. 8.

In some embodiments, the emulation environment 100 includes a source emulation system 140 and a target emulation system 150. The source emulation system 140 records an emulation during an emulation session. The recorded emulation can then be ported to the target emulation system 150 for a replay. Note, the naming of source emulation system 140 and target emulation system 150 is for ease of explanation and not intended to be limiting. Each emulation system 140 or 150 may be a source or a target emulation system. For example, the emulation system 150 may also be used to emulate a circuit design, and the emulation performed on emulation system 150 may also be ported to the emulation system 140. In such a case, the emulation system 150 would be the source emulation system, and the emulation system 140 would be the target emulation system.

During the emulation session, host system 120 communicates with the emulated design that is programmed into the source emulation system 140 using binary ports (also referred to as "message ports."). Each message port has a single ready bit. The ready bit has a value 1 when a new message is ready to be consumed by the design. Otherwise, the ready bit has a value 0. A combined value of all the ready bits forms a ready bit message (also referred to as RBM). In some embodiments, any specific control signals that are controlled by the host system 120 including all clock controls may also be deemed as ready bits. Notably, all message ports and their ready bits do not pre-exist inside the emulation system, but are a part of the emulated design that is created during the compilation process. Therefore, the message ports and their ready bits depend on machines, architecture, configuration of the emulation system, and/or compilation of the DUT 110, and they can change significantly from one platform to another. For example, for a given DUT 110, the message ports and their ready bits of emulation system 140 would be different from those of emulation system 150. Typically, the message ports and the control signals are grouped and distributed between the FPGAs in different ways between different platforms. Message ports are accessed by the host system 120 using their register-transfer level (RTL) logical names. The ready bits also have RTL logical names, however, the ready bits are generally not controlled and cannot be accessed by the host system 120.

As illustrated in FIG. 1, the host system 120 further includes a cross-platform transformer 160, and the emulation system 140 or 150 further includes a timing message module 144 or 154. In some embodiments, the cross-platform transformer 160 is a component of the compiler 130. In some embodiments, the cross-platform transformer 160 and the compiler 130 are separate components configured to communicate with each other.

The cross-platform transformer 160 and the timing message modules 144 work together to record messages, annotating the messages with timing information during an execution of an emulation, recording the time annotated messages in files, and transforming the annotated messages for porting to another emulation system or platform, such as the target emulation system 150. The timing message module 154 of the target emulation system 150 may receive and interpret the transformed annotated messages, and replay the recorded emulation based thereon.

In some embodiments, timing message module 144 annotates ready bits messages (RBMs) with timing information, and sends the time-annotated RBMs (also referred to TARBMs) to the host system 120. All the ready bits located in each FPGA are recorded into a binary message, herein referred to as an RBM. A timing annotation is created and added to this message, which is referred to as a TARBM.

In some embodiments, the timing message module 144 or 154 is a dedicated firmware implemented on the emulation system 140 or 150. The host system 120 receives the TARBMs and records the received TARBMs in a set of TARBM files, each of which corresponds to a particular FPGA of the source emulation system 140. In some embodiments, the host system 120 records each TARBM that corresponds to ready bits in a particular FPGA in a particular TARBM file. As such, each TARBM file records a subset of TARBMs that correspond to ready bits in a particular FPGA of the source emulation system 140. In some embodiments, the timing information is an emulation cycle number represented as an unsigned integer.

Once a set of TARBM files are generated, the host system 120 can replay the recorded stimulus by injecting the TARBM files for the corresponding FPGAs on the same emulation system. The same timing message module 144 or 154 accepts the TARBM entries and handles design stimuli synchronization according to the timing annotation of the TARMB entries. In some embodiments, the TARMB file only records a subset of cycles, during which the RBM values change compared to a previous cycle. The exception is that the first cycle and the last cycle of the emulation are always included, where the first cycle represents the beginning of the emulation, and the last cycle represents the end of the emulation. Additional details about TARBM files are further discussed below with respect to FIG. 3.

Further, the principles described herein not only allow a same emulation platform to replay its own emulation, but also allow cross-platform replay, although cross-platform replay will require additional steps involving the cross-platform transformer 160 implemented at the host system 120 and a timing message module 154 of a target emulation platform 150. These steps are further discussed below with respect to FIG. 2.

Figure 2:
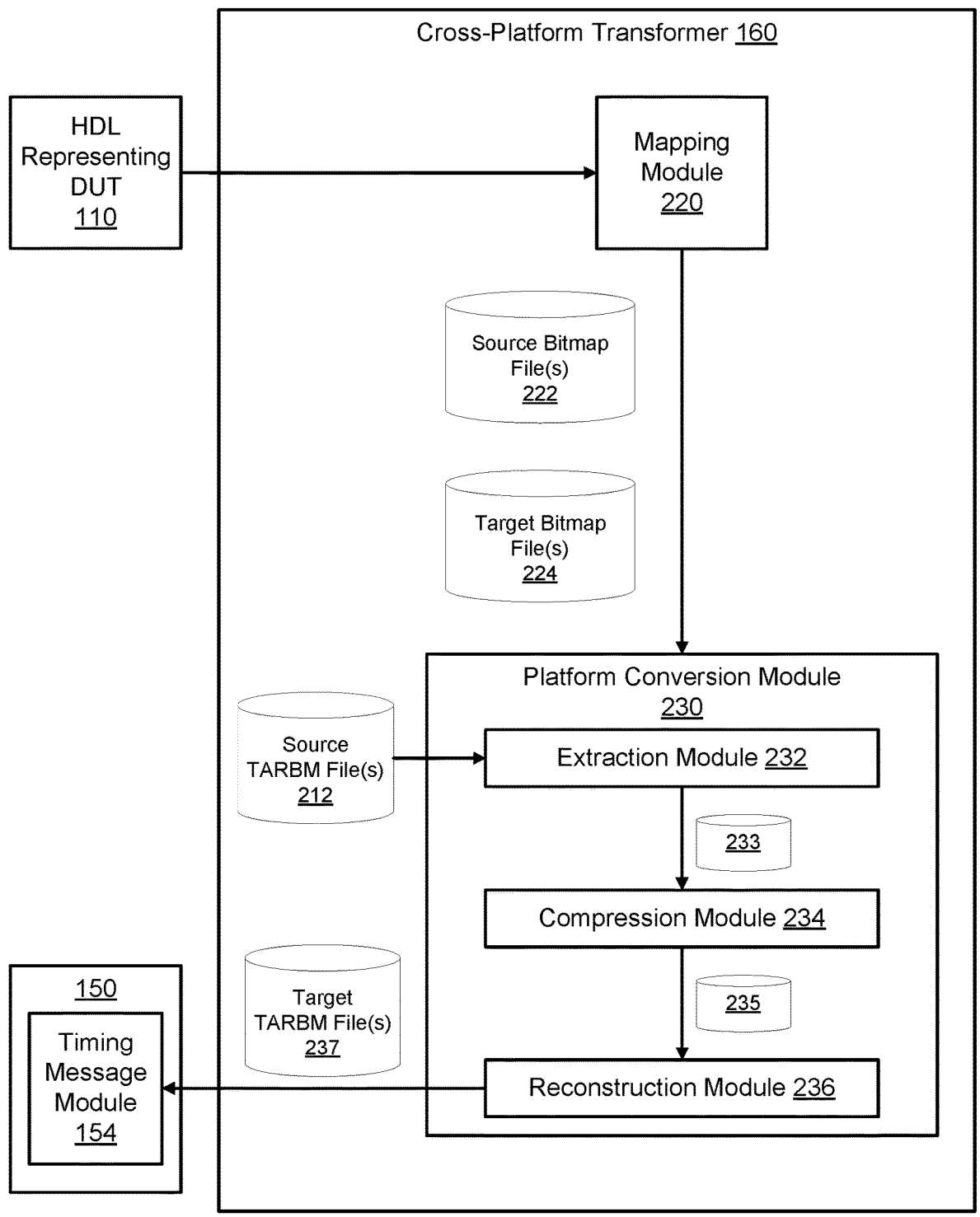
FIG. 2 depicts a diagram of an example cross-platform transformer in accordance with some embodiments of the present disclosure.

FIG. 2 depicts a diagram of an example cross-platform transformer 160 in accordance with some embodiments of the present disclosure. Cross-platform transformer 160 includes a mapping module 220, and a platform conversion module 230. The mapping module 220 is configured to receive the DUT 110 and generate a representation of the RBM structure of each FPGA in each platform. In some embodiments, a bitmap format that describes the connectivity of each bit of RBMs in each emulation platform is used. In some embodiments, the bitmap files include mapping between the ready bit indices inside RBM messages and their RTL logical names. The RBM bits that do not represent the ready bits are padded by zeros, and these RBM bits do not appear in the bitmap files. For each FPGA, a separate bitmap file that corresponds to the TARBM file of the corresponding FPGA is generated. In some embodiments, mapping module 220 generates a set of source bitmap files 222 corresponding to a first set of FPGAs 142 on the source emulation platform 140, and a second set of target bitmap files 224 corresponding to a second set of FPGAs 152 on the target emulation platform 150. Additional details about bitmap files are further discussed with respect to FIGS. 4A-4C.

The platform conversion module 230 includes an extraction module 232, a compression module 234, and a reconstruction module 236. The extraction module 232 may extract bit columns annotated with cycle numbers from TARBM files based on the source TARBM files 212 and the source bitmap files 222. In some embodiments, for each bit presented in each of the source bitmap files, a bit column annotated with a cycle number from the corresponding TARBM file is extracted. In some embodiments, the extracted data is recorded in a set of files 233 (also referred to as a time-annotated bit (TAB) files). Additional details about the TAB files are further discussed below with respect to FIG. 5A.

The compression module 234 may compress the information in the TAB files by filtering out the lines that do not reflect a change in the bit value. The exception is that the first line that corresponds to an initial emulation cycle and a last line that corresponds to an end emulation cycle are always included. Additional details about compressed TAB files are further discussed below with respect to FIG. 5B.

The reconstruction module 236 may reconstruct a set of target TARBM files 237 that correspond to the set of target bitmap files. Each target bitmap file contains a subset of bits of the source bitmap files. The bits in the compressed TAB files 235 corresponding to a same FPGA of the target emulation system 150 are merged into a single TARBM file. A such, a set of target TARBM files 237 may be generated. Each TARBM file in the set of target TARBM files 237 corresponds to a particular FPGA on the target emulation system 150. For example, when the target emulation system 150 includes two FPGAs, two target TARBM files 237 are generated. The target TARBM files 237 can then be interpreted by a timing message module 154 of the target emulation system 150 to replay the emulation previously performed on the source emulation system 140.

FIG. 3 illustrates an example TARBM file 212 in Hexadecimal (HEX) format in accordance with one or more embodiments. All the ready bits located in each FPGA are recorded into a binary message, and a timing annotation is created for this message. The created message is called RBM. As illustrated in FIG. 3, the first three lines are metadata of the TARBM file 212. The first line 305 "driver" indicates an RTL logical path pointing to the RBM source location inside the emulation system 140. The second line 310 "port" indicates a dedicated message port name that send TARBM entries to the host. The third line 315 "size" indicates a size in binary WORDs of TARBM entry.

All other lines are TARBM entries where each line has a same structure. Notably, the third line 315 indicates the size of the RBM message is 3 WORDS. Thus, each TARBM entry (i.e., each line below the third line) includes 3 WORDs. RBM size is usually larger than the number of ready bits in its FPGA. In particular, the two initial WORDs represent a 64-BIT cycle number. The rest of the WORDs (here, the third WORD) represent the RBM content. It is advantageous to choose a size to be a multiple of binary WORDs. The remaining bits of the RBM which are not used and do not represent the ready bits are padded with zeroes.

For example, the first TARBM entry contains an initial state of RBM (which is #0) and has the cycle number #ffffffff ffffffff. The second TARBM entry has a cycle number #00102137 in Hex (which is 1057079 in decimal), and a message #3 in Hex (which is 0011 in binary) the third TARBM entry has a cycle number #00152142 (which is 1384770 in decimal), and a message #7 in Hex (which is 0111 in binary); and so on and so forth. In some embodiments, every cycle and its RBM values are recorded. In some embodiments, only a subset of cycles and their RBM values are recorded. In some embodiments, the subset of cycles includes a first cycle when the emulation starts, a last cycle when the emulation ends, and the cycles during which their RBM values change.

A separate TARBM file is created for each FPGA. Together these files form a CAPTURE message database. During a replay, the host system 120 injects and/or consumes the TARBM files for each design message port and each FPGA. The timing message module 144 or 154 that helped create the TARBM files reads the entries in the TARBM files and handles design stimuli synchronization according to the timing annotation of TARBM entries.

As a simplified example, assuming the source emulation system 140 only has one FPGA, the TARBM file 212 is the source TARBM file corresponding to the one FPGA and generated during a recorded emulation run on the source emulation system 140, and the target emulation system 150 (having two FPGAs) is to replay the recorded emulation run. To enable such portability, the source TARBM file 212 needs to be converted to target TARBM files that can be executed on the target emulation system 150. Since the target emulation system 150 has two FPGAs, two target TARBM files need to be generated based on the single source TARBM file 212. To generate the two target TARBM files from the single source TARBM file 212, ready bits structure of each FPGA in the source emulation system 140 and the target emulation system 150 is obtained. As discussed above with respect to FIG. 2, a bitmap file is generated for each FPGA in the source emulation system 140 and the target emulation system 150.

FIG. 4A illustrates an example bitmap file 222 corresponding to the single FPGA in the target emulation system 150 in accordance with one or more embodiments, and FIGS. 4B and 4C illustrate examples of bitmap files 224A, 224B corresponding to the two FPGAs in the target emulation system 150. In each of the bitmap files 222, 224A, 224B, the first line contains the RBM size in bits, including non-used bits that are padded by zeroes. Here, the RBM size is 32 bits, which is 8 digits in Hex. The rest of lines are entries that have a same structure. In each of these lines, there is (1) an RBM bit index, which represents a location of the bit inside the RBM from the right, and (2) an RTL logical signal name of the corresponding ready bit.

For example, the bitmap file 222 includes four entries, (1) ready bit at index 0, corresponding to clk_negedge_ready_0 RTL signal name, (2) ready bit at index 1, corresponding to clk_posedge_ready_0 RTL signal name, (3) ready bit at index 2, corresponding to driver_1.msg_in_0 RTL signal name, and (4) ready bit at index 3, corresponding to driver_2.msg_in_0 RTL signal name. On the other side, the bitmap file 224A includes three entries. The RTL logical signal names of the three entries in the bitmap file 224A correspond to those of the first three entries in the bitmap file 222. The bitmap file 224B includes one entry that corresponds to that of the last entry in the bitmap file 222. As such, for the two different emulation platforms 140, 150, each entry in a first set of bitmap files 222 corresponding to the source emulation platform 140 has a one-on-one mapping to an entry in a second set of bitmap files 224A, 224B corresponding to the target emulation platform 150.

Further, for each emulation platform, there is also a one-on-one mapping between the TARBM files and the bitmap files that describe their bits connectivity. These one-on-one mapping relationships can be used to perform platform-to-platform conversion of TARBM files.

As discussed above with respect to FIG. 2, The conversion may be performed by the platform conversion module 230. In some embodiments, the extraction module 232 extracts TAB files from the source TARBM file 212. FIG. 5A illustrates an example of a set of TAB files extracted from the source TARBM file 212 shown in FIG. 3. Referring back to FIG. 3, the third WORD in each entry represents the RBM message. Each of the RBM messages may be converted into a binary number, which indicates the values of the ready bits. Based on the values of the ready bits and the corresponding timing information in the TARBM file 212, time-annotated bit values (also referred to as TABs) may be identified. Note, each RBM message includes total 32 bits. However, the first 28 bits are padded with zeroes, and only the last four bits contain messages. Thus, only the last four bits are ready bits.

For each of the four TABs, a TAB file is generated. In some embodiments, as illustrated in FIG. 5A, in each TAB file, the first line shows the RTL logical signal name of the corresponding ready bit, which is obtained from the bitmap file 222. For example, the first line of TAB file of bit 0 shows clk_negedge_ready_0, corresponding to the first entry of bitmap file 222 of FIG. 4A; the first line of TAB file of bit 1 shows clk_posedge_ready_0, corresponding to the second entry of bitmap file 222 of FIG. 4A; the first line of TAB file of bit 2 shows driver_1.msg_in_0, corresponding to the third entry of bitmap file 222 of FIG. 4A, and the first line of TAB file of bit 3 shows driver_2.msg_in_0, corresponding to the fourth entry of bitmap file 222 of FIG. 4A.

After the first line, TAB file of bit 0 records time-annotated binary values of the first ready bit in RBM messages, TAB file of bit 1 records time-annotated binary values of the second ready bit in RBM messages, TAB file of bit 2 records time-annotated binary values of the third ready bit in RBM messages, and TAB file of bit 3 records time-annotated binary values of the fourth ready bit in RBM messages.

In some embodiments, after the first line, each of the TAB files records cycle number and its corresponding ready bit value, which may be derived from the TARBM file 212 of FIG. 3. Referring back to FIG. 3, the third WORD in each entry line is an RBM message in Hex format, which may be converted into a binary format. For example, the RBM message of the first line is #0 in Hex (which is 0000 in binary), as such for each of the TAB files 233, the first line is entered with the clock cycle of the first line in TARBM file 212, and a binary number corresponding to the binary RBM message. Because the binary numbers are 0, 0, 0, 0 here, the first entry of each TAB files includes a bit value 0.

As another example, the RBM message of the second line is #3 in Hex (which is 0011 in binary), as such for each of the TAB files 233, the second line is entered with the clock cycle of the second line in TARBM file 212, and a binary number corresponding to the binary RBM message. Here, the binaries are 0, 0, 1, 1, corresponding to TAB of bit 3, TAB of bit 2, TAB of bit 1, TAB of bit 0. Again, the RBM message of the third line is #7 in Hex (which is 0111 in binary), as such each of the TAB files 233, the third line is entered with the clock cycle of the third line in TARBM file 212, and a binary number corresponding to the binary RBM message. Here, the binaries are 0, 1, 1, 1, corresponding to TAB of bit 3, TAB of bit 2, TAB of bit 1, TAB of bit 0. This process repeats until all the entries in the TARBM file 212 are extracted and entered into the TAB files 233.

Once the TAB files 233 are generated, the compression module 234 is configured to compress the TAB files 233 to remove the lines that do not reflect a change. An exception is that the first line that corresponds to the beginning of the emulation cycle, and a last line that corresponds to the end of the emulation cycle will always be maintained.

FIG. 5B illustrates an example compressed TAB files 235 generated based on the TAB files 233 of FIG. 5A. As shown in FIG. 5B, the bit value in each table now has a pattern of alternating 0 and 1 (except the last entry). The entries that result in repeating 0s and/or 1s have been removed.

A set of target TARBM files may be generated based on the compressed TAB files 235 and the target bitmap files 224A, 224B. Referring back to FIGS. 4B and 4C, the bitmap files 224A, 224B indicate that a first FPGA corresponds to REAY bits 0, 1, and 2; and a second FPGA corresponds to ready bit 3. As such, the compressed TAB files for bits 0, 1, and 2 are to be merged into a single TARBM file. The TARBM file will include cycles and their corresponding RBM values generated based on the bit values in the TAB files for bits 0, 1, and 2. TAB file for bit 3 is a single file, thus, does not need to be merged, and the entries in TAB file for bit 3 will be converted to TARBM file 2 directly.

For example, the first entry of TAB file of bit 0, TAB file of bit 1, and TAB file of bit 2 shows cycle number #ffffffff ffffffff and a bit value 0. Thus, this line will be converted to a first entry in the TARBM file as #ffffffff ffffffff with a RBM Hex value 0 (=binary 000). The second entry of TAB file of bit 0 and TAB file of bit 1 has a clock cycle value #00102137, while the second entry of TAB file of bit 2 has a clock cycle value #00152142. Because #00102137< #00152142, cycle #00102137's RBM value and cycle #00102137's RBM value will be computed separately. At cycle #00102137, the value of the bit 2 does not change. Thus, the value of bit 2 will remain as 0. Further, at cycle #00102137, bit 0 has a bit value 1, and TAB of bit 1 also has a value 1. As such, the second entry of TARBM file will have a cycle value #00102137 and a RBM Hex value 3 (=binary 011). After that, cycle #00152142's RBM value is computed. At cycle #00152142, the values of bits 0 and 1 have not changed. Thus, they are the same as the values at cycle #00102137, which are 1 and 1. However, value of bit 2 is changed to 1. As such, a third entry in the TARBM file will be generated based on the binary values 1, 1, 1 for each bit, which will have a cycle value #00152142 and a RBM hex value 7 (=binary 111). This process can repeat as many times as necessary to merge all the entries in TAB files for bits 0, 1, and 2 into a single TARBM file.

For converting TAB file for bit 3 into a second TARBM file, the reconstruction module 236 can simply convert the bit values into a Hex value, and store them into a TARBM file format.

FIG. 5C illustrates an example of target TARBM files 237 in accordance with one or more embodiments. The first three lines of the TARBM files include information related to the driver, port, and size. The TARBM file 1 is generated by merging the TAB files for bit 0, bit 1, and bit 2. The TARBM file 2 is generated based on TAB file for bit 3.

The above discussion describes a simplified example of porting an emulation from a source emulation platform having a single FPGA to a target emulation platform having two FPGAs. A person of ordinary skill in the art would understand that similar principles may be implemented for porting an emulation from a different source emulation platform having any number of FPGAs and/or other circuit devices to a different target emulation platform having any number of FPGAs and/or other circuit devices.

Figure 6:
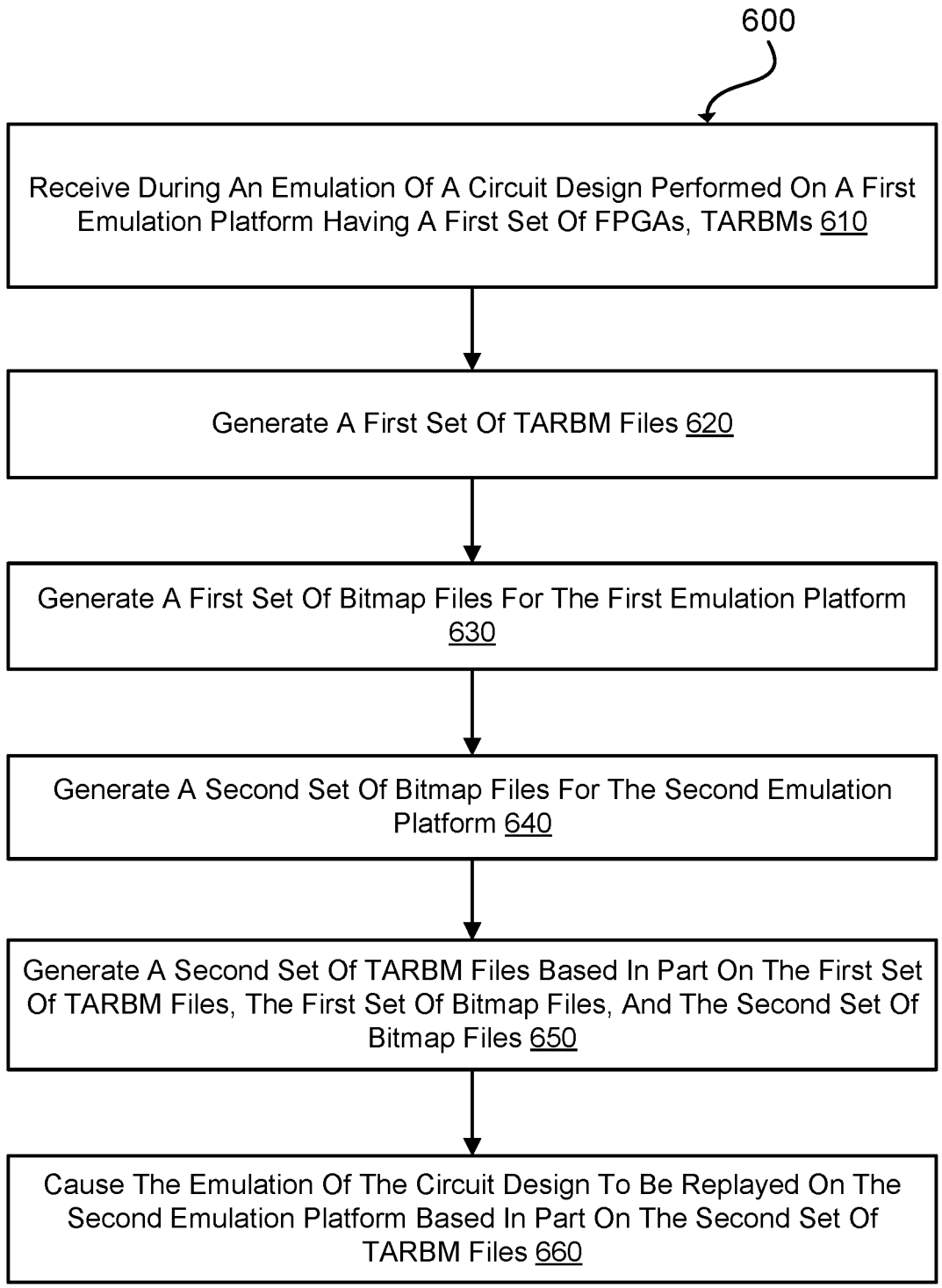
FIG. 6 is a flowchart of an example method for porting an emulation from a first emulation platform to a second emulation platform in accordance with one or more embodiments.

FIG. 6 is a flowchart of an example method 600 for porting an emulation of a circuit design from a first emulation platform to a second emulation platform in accordance with one or more embodiments. The method 600 may be implemented at the host system 120 of FIG. 1. The first emulation platform may correspond to the source emulation system 140 of FIG. 1, and the second emulation platform may correspond to the target emulation system 150 of FIG. 1.

The host system 120 receives 610, during an emulation of a circuit design performed on the first emulation platform having a first set of FPGAs, TARBMs. Each of the TARBMs contains an RBM annotated with timing information. Each RBM is a message that records a combined value of ready bits of the emulated circuit design. During the emulation, host system 120 communicates with the emulated design that is programmed into the source emulation system 140 using binary ports (also referred to as "message ports."). Each message port has a single ready bit. A combined value of all the ready bits forms a ready bit message (also referred to as RBM). In some embodiments, a special firmware implemented at the first emulation platform, such as the time message module 144 implemented at the source emulation system, is caused to annotate the RBMs with timing information. In some embodiments, the timing information is emulation cycles corresponding to the RBMs.

The host system 210 then generates a first set of TARMB files based on the TARBMs. Each TARBM file in the first set of TARBM files records a subset of TARBMs corresponding to a particular FPGA in the first set of FPGAs.

The host system 210 also generates 630 a first set of bitmap files for the first emulation platform, and generates 640 a second set of bitmap files for the second emulation platform. Each bitmap describes the connectivity of each ready bit of RBMs in each FPGA of an emulation platform. In some embodiments, the bitmap files include a mapping between the ready bit indices inside RBM messages and their RTL logical names.

The host system 210 generates 650 a second set of TARBM files based in part on the first set of TARBM files, the first set of bitmap files, and the second set of bitmap files. In some embodiments, generating 650 the second set of TARBM files includes, for each bit presented in each of the source bitmap files, extracting a bit column annotated with a cycle number from the corresponding TARBM file. In some embodiments, the extracted data is recorded in a set of files 233 (also referred to as a time-annotated bit (TAB) files). In some embodiments, the set of TAB files are then compressed by removing the entries that do not reflect a change in bit value. The second set of TARBM files are generated based on the set of compressed TAB files and the second set of bitmap files.

The host system 210 causes 660 the emulation of the circuit design to be replayed on the second emulation platform based in part on the second set of TARBM file. The second emulation platform can simply map each bit value of ready bits in the TARBM files to each FPGA thereon and its ports to replay the emulation.

Figure 7:
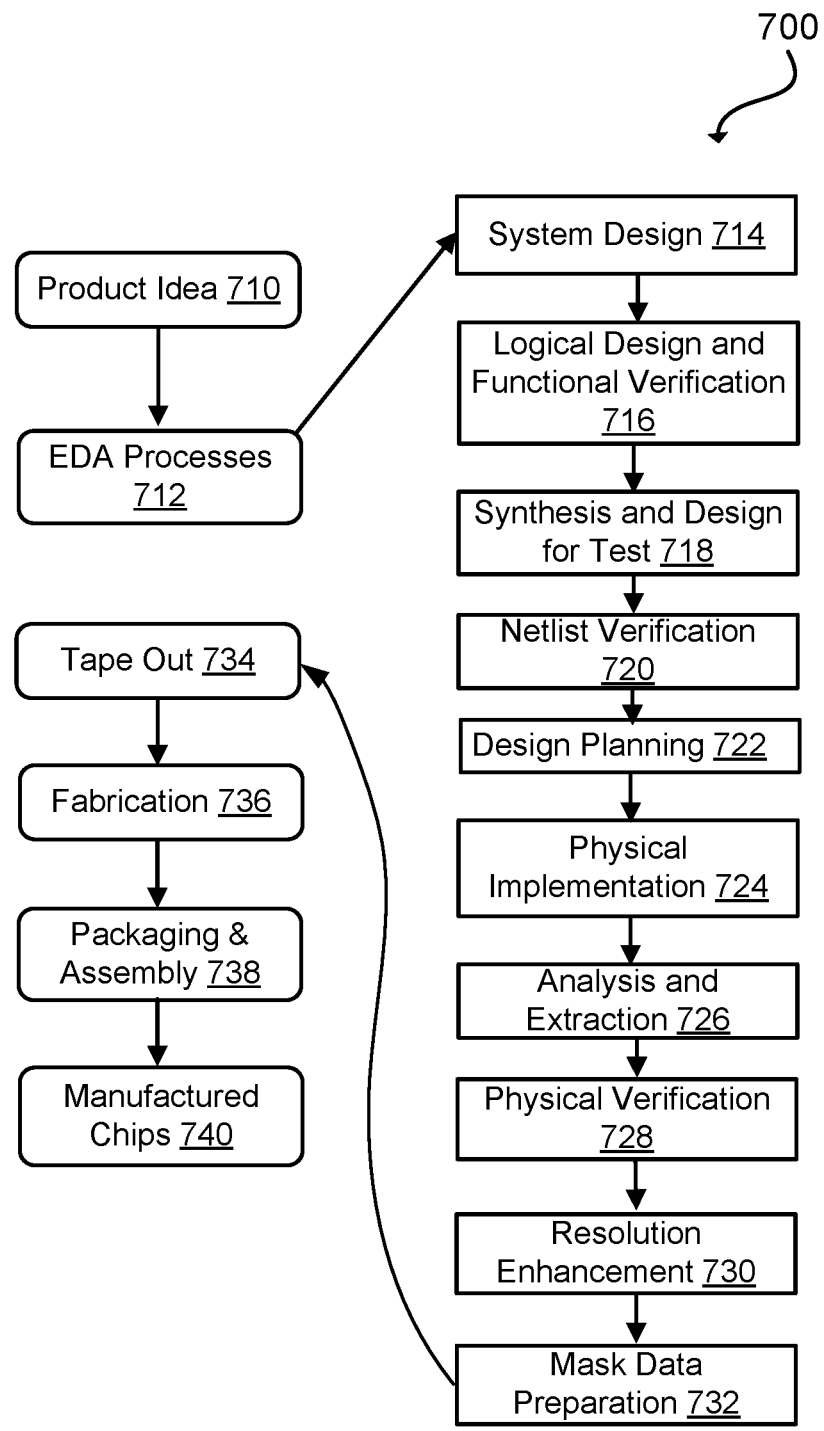
FIG. 7 depicts a flowchart of various processes used during the design and manufacture of an integrated circuit in accordance with some embodiments of the present disclosure.

FIG. 7 illustrates an example set of processes 700 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 710 with information supplied by a designer, information which is transformed to create an article of manufacture that uses a set of EDA processes 712. When the design is finalized, the design is taped-out 734, which is when artwork (e.g., geometric patterns) for the integrated circuit is sent to a fabrication facility to manufacture the mask set, which is then used to manufacture the integrated circuit. After tape-out, a semiconductor die is fabricated 736 and packaging and assembly processes 738 are performed to produce the finished integrated circuit 740.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding tools of that layer (e.g., a formal verification tool). A design process may use a sequence depicted in FIG. 7. The processes described by be enabled by EDA products (or tools).

During system design 714, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 716, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 718, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 720, the netlist is checked for compliance with timing constraints and for correspondence with the HDL code. During design planning 722, an overall floor plan for the integrated circuit is constructed and analyzed for timing and top-level routing.

During layout or physical implementation 724, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 726, the circuit function is verified at the layout level, which permits refinement of the layout design. During physical verification 728, the layout design is checked to ensure that manufacturing constraints are correct, such as DRC constraints, electrical constraints, lithographic constraints, and that circuitry function matches the HDL design specification. During resolution enhancement 730, the geometry of the layout is transformed to improve how the circuit design is manufactured.

During tape-out, data is created to be used (after lithographic enhancements are applied if appropriate) for production of lithography masks. During mask data preparation 732, the 'tape-out' data is used to produce lithography masks that are used to produce finished integrated circuits.

A storage subsystem of a computer system (such as computer system 900 of FIG. 9, or host system 807 of FIG. 8) may be used to store the programs and data structures that are used by some or all of the EDA products described herein, and products used for development of cells for the library and for physical and logical design that use the library.

Figure 8:
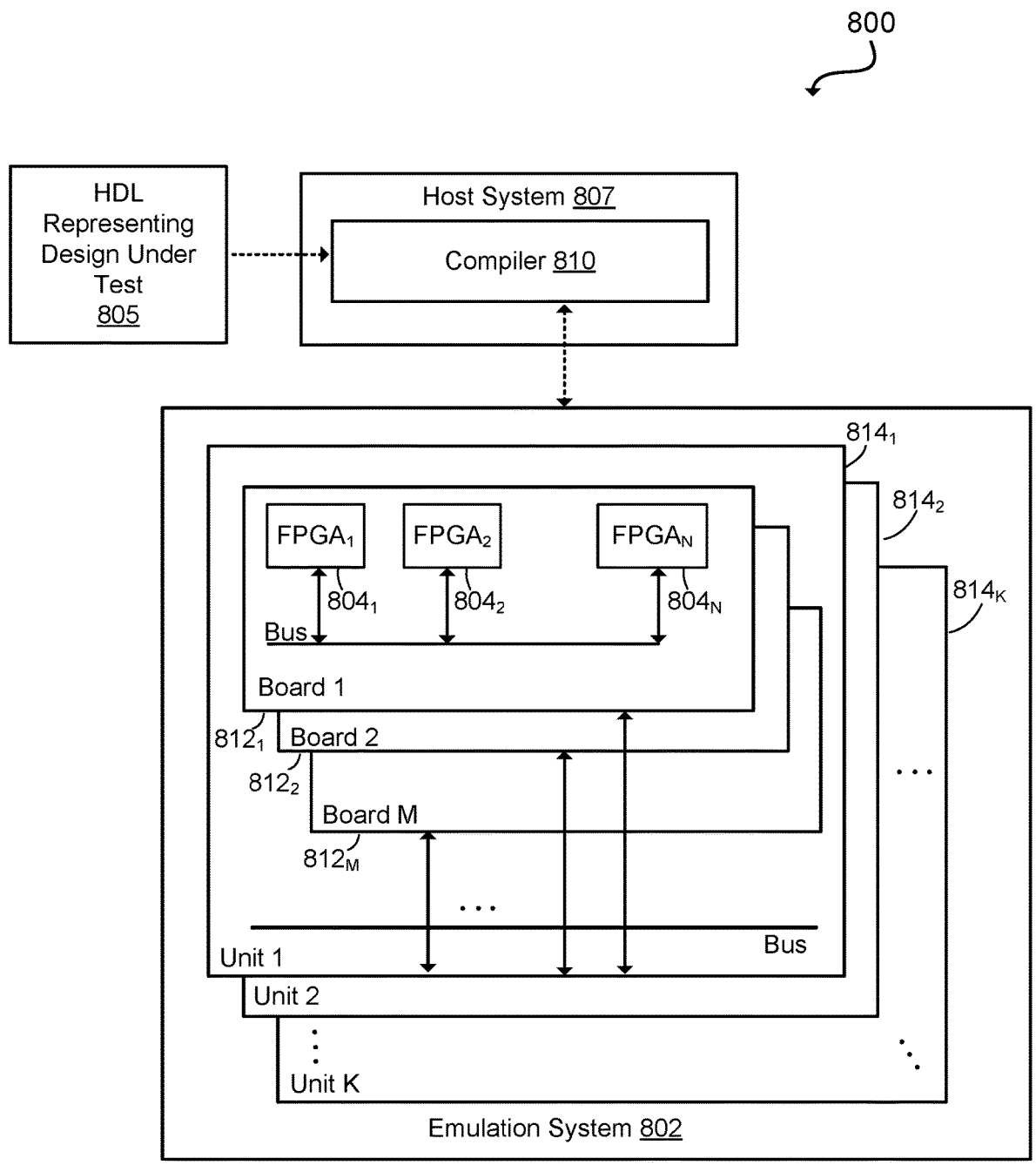
FIG. 8 depicts a diagram of an example emulation system in accordance with some embodiments of the present disclosure.

FIG. 8 depicts a diagram of an example emulation environment 800. An emulation environment 800 may be configured to verify the functionality of the circuit design. The emulation environment 800 may include a host system 807 (e.g., a computer that is part of an EDA system) and an emulation system 802 (e.g., a set of programmable devices such as Field Programmable Gate Arrays (FPGAs) or processors). The host system generates data and information by using a compiler 810 to structure the emulation system to emulate a circuit design. A circuit design to be emulated is also referred to as a Design Under Test ('DUT') where data and information from the emulation are used to verify the functionality of the DUT.

The host system 807 may include one or more processors. In the embodiment where the host system includes multiple processors, the functions described herein as being performed by the host system can be distributed among the multiple processors. The host system 807 may include a compiler 810 to transform specifications written in a description language that represents a DUT and to produce data (e.g., binary data) and information that is used to structure the emulation system 802 to emulate the DUT. The compiler 810 can transform, change, restructure, add new functions to, and/or control the timing of the DUT.

The host system 807 and emulation system 802 exchange data and information using signals carried by an emulation connection. The connection can be, but is not limited to, one or more electrical cables such as cables with pin structures compatible with the Recommended Standard 232 (RS232) or universal serial bus (USB) protocols. The connection can be a wired communication medium or network such as a local area network or a wide area network such as the Internet. The connection can be a wireless communication medium or a network with one or more points of access using a wireless protocol such as BLUETOOTH or IEEE 802.11. The host system 807 and emulation system 802 can exchange data and information through a third device such as a network server.

The emulation system 802 includes multiple FPGAs (or other modules) such as FPGAs 804$_1$ and 804$_2$ as well as additional FPGAs to 804$_N$. Each FPGA can include one or more FPGA interfaces through which the FPGA is connected to other FPGAs (and potentially other emulation components) for the FPGAs to exchange signals. An FPGA interface can be referred to as an input/output pin or an FPGA pad. While an emulator may include FPGAs, embodiments of emulators can include other types of logic blocks instead of, or along with, the FPGAs for emulating DUTs. For example, the emulation system 802 can include custom FPGAs, specialized ASICs for emulation or prototyping, memories, and input/output devices.

A programmable device can include an array of programmable logic blocks and a hierarchy of interconnections that can enable the programmable logic blocks to be interconnected according to the descriptions in the HDL code. Each of the programmable logic blocks can enable complex combinational functions or enable logic gates such as AND, and XOR logic blocks. In some embodiments, the logic blocks also can include memory elements/devices, which can be simple latches, flip-flops, or other blocks of memory. Depending on the length of the interconnections between different logic blocks, signals can arrive at input terminals of the logic blocks at different times and thus may be temporarily stored in the memory elements/devices.

FPGAs $804_1$-$804_N$ may be placed onto one or more boards $812_1$ and $812_2$ as well as additional boards through $812_M$. Multiple boards can be placed into an emulation unit $814_1$. The boards within an emulation unit can be connected using the backplane of the emulation unit or any other types of connections. In addition, multiple emulation units (e.g., $814_1$ and $814_2$ through $814_K$) can be connected to each other by cables or any other means to form a multi-emulation unit system.

For a DUT that is to be emulated, the host system 807 transmits one or more bit files to the emulation system 802. The bit files may specify a description of the DUT and may further specify partitions of the DUT created by the host system 807 with trace and injection logic, mappings of the partitions to the FPGAs of the emulator, and design constraints. Using the bit files, the emulator structures the FPGAs to perform the functions of the DUT. In some embodiments, one or more FPGAs of the emulators may have the trace and injection logic built into the silicon of the FPGA. In such an embodiment, the FPGAs may not be structured by the host system to emulate trace and injection logic.

The host system 807 receives a description of a DUT that is to be emulated. In some embodiments, the DUT description is in a description language (e.g., a register transfer language (RTL)). In some embodiments, the DUT description is in netlist level files or a mix of netlist level files and HDL files. If part of the DUT description or the entire DUT description is in an HDL, then the host system can synthesize the DUT description to create a gate level netlist using the DUT description. A host system can use the netlist of the DUT to partition the DUT into multiple partitions where one or more of the partitions include trace and injection logic. The trace and injection logic traces interface signals that are exchanged via the interfaces of an FPGA. Additionally, the trace and injection logic can inject traced interface signals into the logic of the FPGA. The host system maps each partition to an FPGA of the emulator. In some embodiments, the trace and injection logic is included in select partitions for a group of FPGAs. The trace and injection logic can be built into one or more of the FPGAs of an emulator. The host system can synthesize multiplexers to be mapped into the FPGAs. The multiplexers can be used by the trace and injection logic to inject interface signals into the DUT logic.

The host system creates bit files describing each partition of the DUT and the mapping of the partitions to the FPGAs. For partitions in which trace and injection logic are included, the bit files also describe the logic that is included. The bit files can include place and route information and design constraints. The host system stores the bit files and information describing which FPGAs are to emulate each component of the DUT (e.g., to which FPGAs each component is mapped).

Upon request, the host system transmits the bit files to the emulator. The host system signals the emulator to start the emulation of the DUT. During emulation of the DUT or at the end of the emulation, the host system receives emulation results from the emulator through the emulation connection. Emulation results are data and information generated by the emulator during the emulation of the DUT which include interface signals and states of interface signals that have been traced by the trace and injection logic of each FPGA. The host system can store the emulation results and/or transmits the emulation results to another processing system.

After emulation of the DUT, a circuit designer can request to debug a component of the DUT. If such a request is made, the circuit designer can specify a time period of the emulation to debug. The host system identifies which FPGAs are emulating the component using the stored information. The host system retrieves stored interface signals associated with the time period and traced by the trace and injection logic of each identified FPGA. The host system signals the emulator to re-emulate the identified FPGAs. The host system transmits the retrieved interface signals to the emulator to re-emulate the component for the specified time period. The trace and injection logic of each identified FPGA injects its respective interface signals received from the host system into the logic of the DUT mapped to the FPGA. In case of multiple re-emulations of an FPGA, merging the results produces a full debug view.

The host system receives, from the emulation system, signals traced by logic of the identified FPGAs during the re-emulation of the component. The host system stores the signals received from the emulator. The signals traced during the re-emulation can have a higher sampling rate than the sampling rate during the initial emulation. For example, in the initial emulation a traced signal can include a saved state of the component every X milliseconds. However, in the re-emulation the traced signal can include a saved state every Y milliseconds where Y is less than X. If the circuit designer requests to view a waveform of a signal traced during the re-emulation, the host system can retrieve the stored signal and display a plot of the signal. For example, the host system can generate a waveform of the signal. Afterwards, the circuit designer can request to re-emulate the same component for a different time period or to re-emulate another component.

A host system 807 and/or the compiler 810 may include sub-systems such as, but not limited to, a design synthesizer sub-system, a mapping sub-system, a run time sub-system, a results sub-system, a debug sub-system, a waveform sub-system, and a storage sub-system. The sub-systems can be structured and enabled as individual or multiple modules or two or more may be structured as a module. Together these sub-systems structure the emulator and monitor the emulation results.

The design synthesizer sub-system transforms the HDL that is representing a DUT 805 into gate level logic. For a DUT that is to be emulated, the design synthesizer sub-system receives a description of the DUT. If the description of the DUT is fully or partially in HDL (e.g., RTL or other level of representation), the design synthesizer sub-system synthesizes the HDL of the DUT to create a gate-level netlist with a description of the DUT in terms of gate level logic.

The mapping sub-system partitions DUTs and maps the partitions into emulator FPGAs. The mapping sub-system partitions a DUT at the gate level into a number of partitions using the netlist of the DUT. For each partition, the mapping sub-system retrieves a gate level description of the trace and injection logic and adds the logic to the partition. As described above, the trace and injection logic included in a partition is used to trace signals exchanged via the interfaces of an FPGA to which the partition is mapped (trace interface signals). The trace and injection logic can be added to the DUT prior to the partitioning. For example, the trace and injection logic can be added by the design synthesizer sub-system prior to or after the synthesizing the HDL of the DUT.

In addition to including the trace and injection logic, the mapping sub-system can include additional tracing logic in a partition to trace the states of certain DUT components that are not traced by the trace and injection. The mapping sub-system can include the additional tracing logic in the DUT prior to the partitioning or in partitions after the partitioning. The design synthesizer sub-system can include the additional tracing logic in an HDL description of the DUT prior to synthesizing the HDL description.

The mapping sub-system maps each partition of the DUT to an FPGA of the emulator. For partitioning and mapping, the mapping sub-system uses design rules, design constraints (e.g., timing or logic constraints), and information about the emulator. For components of the DUT, the mapping sub-system stores information in the storage sub-system describing which FPGAs are to emulate each component.

Using the partitioning and the mapping, the mapping sub-system generates one or more bit files that describe the created partitions and the mapping of logic to each FPGA of the emulator. The bit files can include additional information such as constraints of the DUT and routing information of connections between FPGAs and connections within each FPGA. The mapping sub-system can generate a bit file for each partition of the DUT and can store the bit file in the storage sub-system. Upon request from a circuit designer, the mapping sub-system transmits the bit files to the emulator, and the emulator can use the bit files to structure the FPGAs to emulate the DUT.

If the emulator includes specialized ASICs that include the trace and injection logic, the mapping sub-system can generate a specific structure that connects the specialized ASICs to the DUT. In some embodiments, the mapping sub-system can save the information of the traced/injected signal and where the information is stored on the specialized ASIC.

The run time sub-system controls emulations performed by the emulator. The run time sub-system can cause the emulator to start or stop executing an emulation. Additionally, the run time sub-system can provide input signals and data to the emulator. The input signals can be provided directly to the emulator through the connection or indirectly through other input signal devices. For example, the host system can control an input signal device to provide the input signals to the emulator. The input signal device can be, for example, a test board (directly or through cables), signal generator, another emulator, or another host system.

The results sub-system processes emulation results generated by the emulator. During emulation and/or after completing the emulation, the results sub-system receives emulation results from the emulator generated during the emulation. The emulation results include signals traced during the emulation. Specifically, the emulation results include interface signals traced by the trace and injection logic emulated by each FPGA and can include signals traced by additional logic included in the DUT. Each traced signal can span multiple cycles of the emulation. A traced signal includes multiple states and each state is associated with a time of the emulation. The results sub-system stores the traced signals in the storage sub-system. For each stored signal, the results sub-system can store information indicating which FPGA generated the traced signal.

The debug sub-system allows circuit designers to debug DUT components. After the emulator has emulated a DUT and the results sub-system has received the interface signals traced by the trace and injection logic during the emulation, a circuit designer can request to debug a component of the DUT by re-emulating the component for a specific time period. In a request to debug a component, the circuit designer identifies the component and indicates a time period of the emulation to debug. The circuit designer's request can include a sampling rate that indicates how often states of debugged components should be saved by logic that traces signals.

The debug sub-system identifies one or more FPGAs of the emulator that are emulating the component using the information stored by the mapping sub-system in the storage sub-system. For each identified FPGA, the debug sub-system retrieves, from the storage sub-system, interface signals traced by the trace and injection logic of the FPGA during the time period indicated by the circuit designer. For example, the debug sub-system retrieves states traced by the trace and injection logic that are associated with the time period.

The debug sub-system transmits the retrieved interface signals to the emulator. The debug sub-system instructs the debug sub-system to use the identified FPGAs and for the trace and injection logic of each identified FPGA to inject its respective traced signals into logic of the FPGA to re-emulate the component for the requested time period. The debug sub-system can further transmit the sampling rate provided by the circuit designer to the emulator so that the tracing logic traces states at the proper intervals.

To debug the component, the emulator can use the FPGAs to which the component has been mapped. Additionally, the re-emulation of the component can be performed at any point specified by the circuit designer.

For an identified FPGA, the debug sub-system can transmit instructions to the emulator to load multiple emulator FPGAs with the same configuration of the identified FPGA. The debug sub-system additionally signals the emulator to use the multiple FPGAs in parallel. Each FPGA from the multiple FPGAs is used with a different time window of the interface signals to generate a larger time window in a shorter amount of time. For example, the identified FPGA can require an hour or more to use a certain amount of cycles. However, if multiple FPGAs have the same data and structure of the identified FPGA and each of these FPGAs runs a subset of the cycles, the emulator can require a few minutes for the FPGAs to collectively use all the cycles.

A circuit designer can identify a hierarchy or a list of DUT signals to re-emulate. To enable this, the debug sub-system determines the FPGA needed to emulate the hierarchy or list of signals, retrieves the necessary interface signals, and transmits the retrieved interface signals to the emulator for re-emulation. Thus, a circuit designer can identify any element (e.g., component, device, or signal) of the DUT to debug/re-emulate.

The waveform sub-system generates waveforms using the traced signals. If a circuit designer requests to view a waveform of a signal traced during an emulation run, the host system retrieves the signal from the storage sub-system. The waveform sub-system displays a plot of the signal. For one or more signals, when the signals are received from the emulator, the waveform sub-system can automatically generate the plots of the signals.

Figure 9:
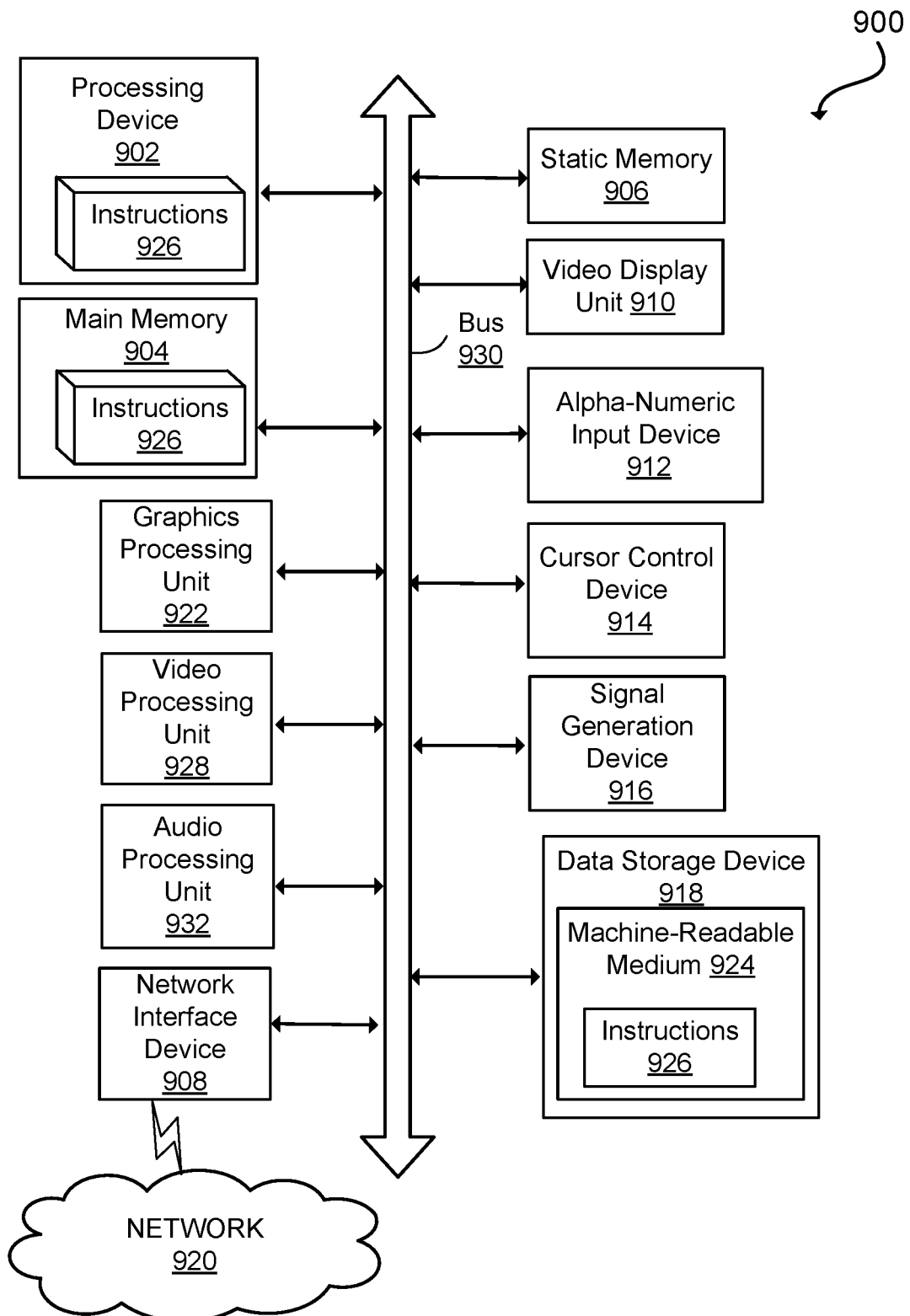
FIG. 9 depicts a diagram of an example computer system in which embodiments of the present disclosure may operate.

FIG. 9 illustrates an example machine of a computer system 900 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM), a static memory 906 (e.g., flash memory, static random access memory (SRAM), etc.), and a data storage device 918, which communicate with each other via a bus 930.

Processing device 902 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 may be configured to execute instructions 926 for performing the operations and steps described herein.

The computer system 900 may further include a network interface device 908 to communicate over the network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable storage medium 924 (also known as a non-transitory computer-readable medium) on which is stored one or more sets of instructions 926 or software embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

In some implementations, the instructions 926 include instructions to implement functionality corresponding to the present disclosure. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 902 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A system comprising:
a memory comprising stored instructions; and
a processor, coupled with the memory and to execute the instructions, the instructions when executed cause the processor to:
receive, during an emulation of a circuit design performed on a first emulation platform having a first set of field programmable gate arrays (FPGAs), time-annotated ready bits messages (TARBMs), each of the TARBMs containing an RBM annotated with timing information, each RBM being a message that records a combined value of ready bits of the emulated circuit design;
generate a first set of TARBM files based on the TARBMs, each TARBM file in the first set of TARBM files recording a subset of TARBMs corresponding to a particular FPGA in the first set of FPGAs;
generate a first set of bitmap files for the first emulation platform, each bitmap file in the first set of bitmap files recording a bit index of each ready bit of an FPGA in the first set of FPGAs, and a register transfer level (RTL) logical signal name of the corresponding ready bit; and
cause the emulation of the circuit design to be replayed on the first emulation platform based in part on the first set of TARBM files.

2. The system of claim 1, wherein the stored instructions further comprise instructions that when executed cause the processor to:
generate a second set of bitmap files for a second emulation platform having a second set of FPGAs, each bitmap file in the second set of bitmap files recording a bit index of each ready bit of an FPGA in the second set of FPGAs, and an RTL logical signal name of the corresponding ready bit;
generate a second set of TARBM files based in part on the first set of TARBM files, the first set of bitmap files, and the second set of bitmap files, each TARBM file in the second set of TARBM files recording a subset of TARBMs corresponding to a particular FPGA in the second set of FPGAs; and
cause the emulation of the circuit design to be replayed on the second emulation platform based in part on the second set of TARBM files.

3. The system of claim 1, wherein the timing information includes an emulation cycle corresponding to an RBM in each TARBM.

4. The system of claim 2, wherein the instructions to generate a first set of bitmap files or the second set of bitmap files further comprises instructions that when executed causes the processor to:
map ready bit indices, that indicate locations of RBM values, to register-transfer level (RTL) logical signal.

5. The system of claim 2, wherein the instructions to generate the second set of TARBM files based in part on the first set of TARBM files further comprises instructions that when executed causes the processor to:
extract time-annotated bits (TAB) values from TARBMs in the first set of TARBM files; and
generate a set of TAB files for the ready bits of the emulated circuit design, each TAB file containing bit values of a corresponding ready bit annotated with timing information.

6. The system of claim 5, wherein the instructions to generate the second set of TARBM files based in part on the first set of TARBM files further comprises instructions that when executed causes the processor to:
remove, for each of the set of TAB files, entries that do not reflect a change in bit value to generate a compressed TAB file, except for a last entry that corresponds to an end emulation cycle; and
generate the second set of TARBM files based on the set of compressed TAB files and the second set of bitmap files.

7. The system of claim 6, wherein each TARBM file records a subset of emulation cycles on a corresponding FPGA, including an initial state of RBM value, an end state of RBM value, and only RBM values that have changed from a previous cycle.

8. The system of claim 1, wherein each TARBM file further includes (1) an RTL logical path pointing to an RBM source location inside the corresponding emulation platform, (2) a dedicated message port name that sends RBM values to a host computing system, and (3) a size in binary WORDs of RBM value.

9. The system of claim 1, wherein each bitmap file further includes a size in bits of RBM value including non-used bits that are padded by zeros.

* * * * *